(12) United States Patent
Conrad et al.

(10) Patent No.: US 6,221,134 B1
(45) Date of Patent: Apr. 24, 2001

(54) APPARATUS AND METHOD FOR SEPARATING PARTICLES FROM A CYCLONIC FLUID FLOW

(75) Inventors: Wayne Ernest Conrad, Hampton; Dave Petersen, Courtice, both of (CA)

(73) Assignee: G.B.D. Corp. (KY)

(*) Notice: Subject to any disclaimer, the term of this patent is extended or adjusted under 35 U.S.C. 154(b) by 0 days.

(21) Appl. No.: 09/361,124

(22) Filed: Jul. 27, 1999

(51) Int. Cl.[7] ................................................. B01D 45/16
(52) U.S. Cl. ............................... 95/271; 55/426; 55/429; 55/433; 55/459.1; 55/DIG. 3
(58) Field of Search ................................. 55/424, 425, 426, 55/429, 433, 428, 459.1, DIG. 3; 95/271

(56) References Cited

U.S. PATENT DOCUMENTS

| | | |
|---|---|---|
| 1,600,762 | 9/1926 | Hawley . |
| 1,797,812 | 3/1931 | Waring .................................. 55/459.1 |
| 1,937,765 | 12/1933 | Leathers . |
| 2,015,464 | 9/1935 | Saint-Jacques ........................... 183/83 |
| 2,152,114 | 3/1939 | Van Tongeren ......................... 183/83 |
| 2,542,634 | * 2/1951 | Davis et al. ............................ 55/426 |
| 2,678,110 | 5/1954 | Madsen ................................... 55/426 |
| 2,731,102 | 1/1956 | James ..................................... 183/34 |
| 2,811,219 | 10/1957 | Wenzl .................................. 55/459.1 |
| 2,846,024 | 8/1958 | Bremi ..................................... 55/426 |
| 2,913,111 | * 11/1959 | Rogers ................................... 55/424 |
| 2,917,131 | 12/1959 | Evans ..................................... 55/424 |
| 2,937,713 | * 5/1960 | Stephenson et al. ................... 55/426 |
| 2,942,691 | * 6/1960 | Dillon .................................... 55/426 |
| 2,946,451 | 7/1960 | Culleton ............................. 210/512.1 |
| 2,981,369 | 4/1961 | Yellott . |
| 3,032,954 | 5/1962 | Racklyeft ................................ 55/282 |
| 3,130,157 | 4/1964 | Kelsall et al. ......................... 210/512 |
| 3,200,568 | 8/1965 | McNeil .................................... 55/191 |
| 3,204,772 | 9/1965 | Ruxton ................................. 44/459.1 |
| 3,217,469 | 11/1965 | Eckert .................................... 55/204 |
| 3,269,097 | 8/1966 | German .................................. 55/337 |
| 3,372,532 | 3/1968 | Campbell ............................... 55/394 |
| 3,426,513 | 2/1969 | Bauer .................................. 55/459.1 |
| 3,518,815 | 7/1970 | McFarland et al. .................... 55/241 |
| 3,530,649 | 9/1970 | Porsch et al. ......................... 55/316 |
| 3,561,824 | 2/1971 | Homan ................................... 302/59 |
| 3,675,401 | 7/1972 | Cordes ................................. 55/459.1 |
| 3,684,093 | 8/1972 | Kono et al. ............................ 55/426 |
| 3,822,533 | * 7/1974 | Oranje ................................... 55/426 |
| 3,898,068 | 8/1975 | McNeil .................................. 55/426 |
| 3,933,450 | 1/1976 | Percevaut .............................. 55/223 |
| 3,988,132 | 10/1976 | Oranje . |

(List continued on next page.)

FOREIGN PATENT DOCUMENTS

| | | |
|---|---|---|
| 112778 | 4/1940 | (AU) . |
| 875134 | 4/1953 | (DE) . |
| 4232382 C1 | 3/1994 | (DE) . |
| 700791 | 8/1951 | (GB) . |
| 2282979 | 4/1995 | (GB) . |
| PCT/JP79/00131 | 5/1979 | (WO) . |
| PCT/GB93/01325 | 6/1993 | (WO) . |
| PCT/GB96/00336 | 2/1996 | (WO) . |
| PCT/US97/15074 | 8/1997 | (WO) . |
| WO98/43721 | 10/1998 | (WO) . |
| PCT/GB99/02313 | 2/2000 | (WO) . |

Primary Examiner—David A. Simmons
Assistant Examiner—Robert A. Hopkins
(74) Attorney, Agent, or Firm—Reed Smith Hazel & Thomas LLP

(57) ABSTRACT

A particle separation member is provided for use with a cyclone separator. The particle separation member divides the separator into a cyclone chamber and a particle receiving chamber. The cyclone chamber and the particle receiving chamber communicating via a plurality of apertures in the particle separation member.

40 Claims, 15 Drawing Sheets

U.S. PATENT DOCUMENTS

| | | | |
|---|---|---|---|
| 3,988,133 | 10/1976 | Schady | 55/459 R |
| 4,097,381 | 6/1978 | Ritzler | 210/259 |
| 4,187,088 | 2/1980 | Hodgson | 55/169 |
| 4,218,805 | 8/1980 | Brazier | 15/321 |
| 4,236,903 | 12/1980 | Malmsten | 55/325 |
| 4,382,804 | 5/1983 | Mellor | 55/1 |
| 4,409,008 | 10/1983 | Solymes | 55/261 |
| 4,486,207 | 12/1984 | Baillie | 55/455 |
| 4,678,588 | 7/1987 | Shortt | 210/788 |
| 4,744,958 | 5/1988 | Pircon | 422/193 |
| 4,778,494 | 10/1988 | Patterson | 55/177 |
| 4,826,515 | 5/1989 | Dyson | 55/345 |
| 4,853,011 | 8/1989 | Dyson | 55/439 |
| 5,078,761 | 1/1992 | Dyson | 55/459.1 |
| 5,080,697 | 1/1992 | Finke | 55/97 |
| 5,090,976 | 2/1992 | Dyson | 55/459.1 |
| 5,267,371 | 12/1993 | Soler et al. | 15/327.5 |
| 5,481,780 | 1/1996 | Daneshvar | 15/339 |
| 5,599,365 | 2/1997 | Alday et al. | 55/426 |
| 5,755,096 | 5/1998 | Holleyman | 60/407 |
| 5,858,043 | 1/1999 | Geise | 55/462 |
| 5,893,938 | 4/1999 | Dyson et al. | 55/459.1 |
| 5,935,279 * | 8/1999 | Kilstrom | 55/337 |
| 5,950,274 | 9/1999 | Kilstrom | 15/350 |
| 6,071,095 | 6/2000 | Verkaart | 417/477.9 |
| 6,071,321 * | 6/2000 | Trapp et al. | 55/426 |

* cited by examiner

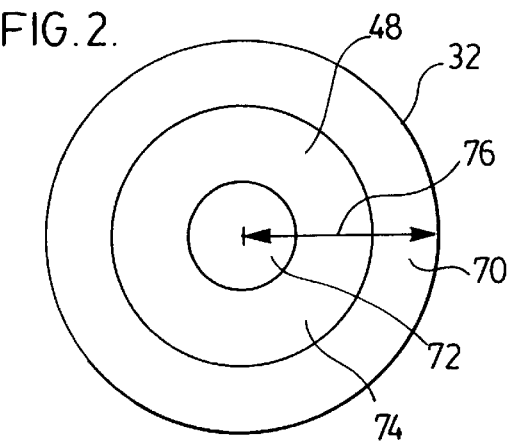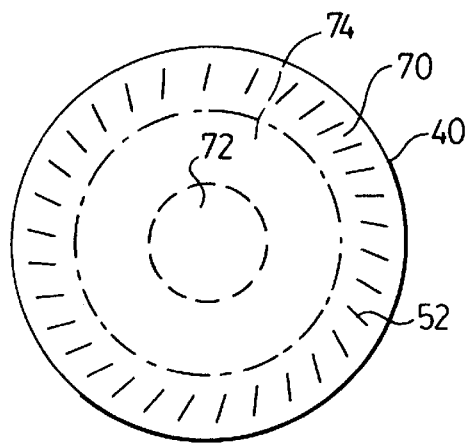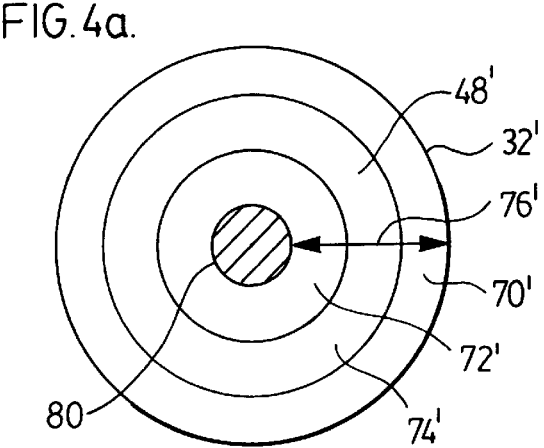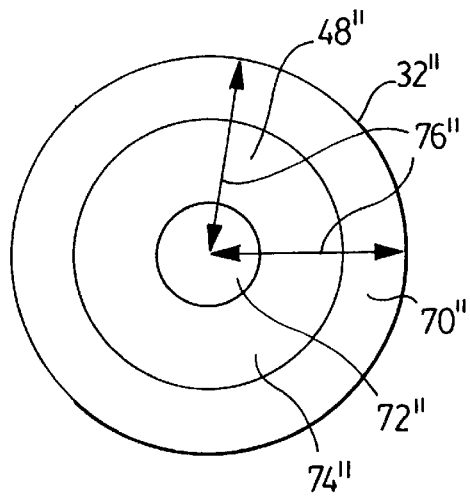

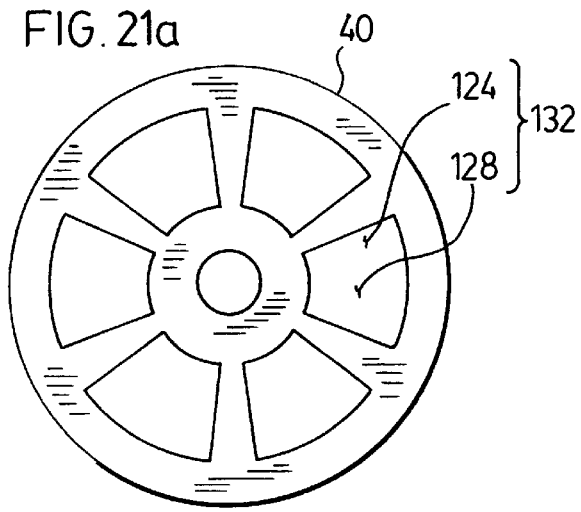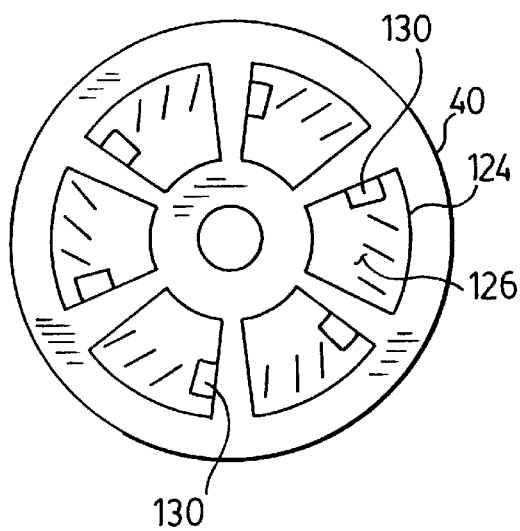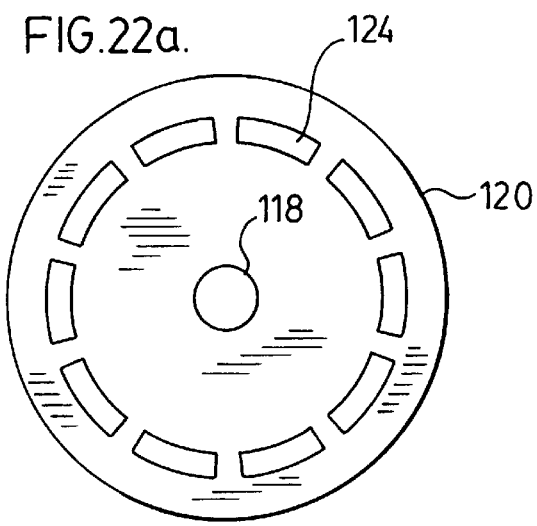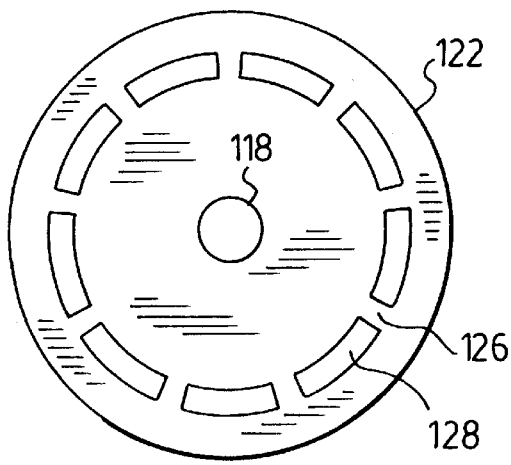

APPARATUS AND METHOD FOR SEPARATING PARTICLES FROM A CYCLONIC FLUID FLOW

FIELD OF THE INVENTION

The present invention relates generally to cyclonic separators. In one particular application, the invention relates to the cyclonic separation of particulate material from an air flow.

BACKGROUND OF THE INVENTION

The use of a cyclone, or multiple cyclones connected in parallel or series, has long been known to be advantageous in the separation of particulate matter from a fluid stream. Typically, a relatively high speed fluid stream is introduced tangentially to a generally cylindrical or frusto-conical container, wherein the dirty air stream is accelerated around the inner periphery of the container. The centrifugal acceleration caused by the travel of the fluid in a cyclonic stream through the cyclone causes the particulate matter to be disentrained from the fluid flow and, eg., to collect at the bottom of the container. A fluid outlet is provided for the extraction of the fluid from the centre of the top of the cyclone container, as is well known in the art.

A typical flow path in a cyclone separator is as follows. Fluid to be treated is introduced tangentially at a fluid inlet located at an upper end of the cyclone container. The fluid stream rotates around the inner surface of the cyclone container, and spirals generally downwardly around the inner surface of the container (if the cyclone container is vertically disposed). At a bottom end of the cyclone container the fluid stream travels radially inwardly, generally along the bottom of the container and then turns upwardly and proceeds vertically up and out of the cyclone container. The particulate matter separating action of the cyclonic flow occurs substantially around the inner surface of the container. Once the fluid moves inwardly to the centre of the container, and upwardly therethrough, there is little or no dirt separation achieved.

The difficulty experienced with prior art cyclonic separators is the reentrainment of the deposited particles back into the outgoing fluid flow. Deposited particles exposed to a high speed cyclonic flow thereover have a tendency to be reentrained. This is particularly problematic when the container has a solid bottom portion in which the dirt collects. However, there is a potential reentrainment problem even if the bottom of the container has a passageway provided in the bottom thereof to convey the separated particulate material away from the container.

If a high degree of separation is required, it is known to connect a plurality of cyclones in series. While using several cyclones in series can provide the required separation efficiency, it has several problems. First, if the separators are to be used in industry, they generally need to accommodate a high flow rate (eg. if they are to be used to treat flue gas). The use of a plurality of cyclones increases the capital cost and the time required to manufacture and install the separators. Further, the use of a plurality of cyclones increases the space requirements to house the cyclones. Accordingly, there is a need for an improved anti-reentrainment means for cyclonic separators.

SUMMARY OF THE INVENTION

In has now been discovered that a single cyclone having improved efficiency (eg. up to 99% efficiency) may be manufactured by positioning in the cyclone chamber a member for creating a dead air space beneath the cyclonic flow region of the cyclone chamber wherein the dead air space is in communication with the cyclonic flow region by a plurality of openings in the member. The openings are provided on the radial outer portion, the radial inner portion or both the radial outer portion and the radial inner portion of the member. This construction effectively traps separated material beneath the cyclonic flow region and inhibits the reentrainment of the separated material. Thus, a single cyclone may be used in place of a plurality of cyclones to achieve the same separation efficiency.

In accordance with the instant invention, there is provided a separator for separating entrained particles from a fluid flow, the separator comprising a cyclone chamber an outer wall and a cyclonic flow region, the cyclonic flow region having a radial width, an outer peripheral portion, a medial portion disposed interior of the peripheral portion and an inner portion disposed interior of the medial portion, a fluid inlet for introducing a cyclonic fluid flow to the cyclonic flow region, a fluid outlet for removing the fluid flow from the cyclone chamber, a particle separating member positioned in the cyclone chamber beneath at least a portion of the cyclonic flow region, the particle separating member having a plurality of apertures, and a particle receiving chamber disposed beneath the particle separating member for receiving particles passing into the particle receiving chamber through the apertures wherein the apertures are disposed on the particle separating member such that the medial portion of the cyclonic flow region is substantially free from said apertures.

The separator may be used in an upright vacuum cleaner. Accordingly, the separator may further comprise a cleaner head adapted for movement over a floor and having a fluid nozzle positionable adjacent the floor, the nozzle in fluid flow communication via a passageway with the separator fluid inlet, a handle for moving the cleaner head over the floor, and a casing for housing the cyclone chamber. The casing is preferably pivotally mounted to the cleaner head. The separator may be used in a canister or a central vacuum cleaner. Accordingly, the passageway may further comprise a flexible portion that is positioned external of the cleaner head and the casing and the handle is affixed to the cleaner head.

In one embodiment, the apertures are sized to inhibit elongate particles from passing there through, whereby elongate particles collect on top of the particle separating member.

In another embodiment, the apertures are shaped to aerodynamically direct particles from the cyclonic flow region into the particle receiving chamber.

The particle separating member may extend under all of the cyclonic flow region to define bottom surface of the cyclonic flow region. Alternately, it may extend only under that portion of the cyclonic flow region in which the apertures are to be provided. For example, the particle separating member may extend essentially under only the outer peripheral portion, the inner portion or both the peripheral and inner portions of the cyclonic flow region.

In accordance with the instant invention, there is also provided a separator for separating entrained particles from a fluid flow, the separator comprising a cyclone chamber for containing a cyclonic flow in a cyclonic flow region, the cyclonic flow region having a radial width, an outer peripheral portion, a medial portion disposed interior of the peripheral portion and an inner portion disposed interior of the medial portion, means for introducing a fluid flow to the cyclone flow region for cyclonic rotation therein, means for removing the fluid flow from the cyclone chamber, particle receiving means disposed beneath the cyclone flow region for receiving particles separated from the fluid flow, separation means for dividing the particle receiving means from the cyclone chamber, and transporting means associated with the separation means for connecting the particle receiving means in flow communication with the cyclonic flow region such that, in operation, particles pass through the transporting means to the particle receiving means wherein said transporting means are positioned outside the medial portion of the cyclonic flow region.

In one embodiment, the particle receiving means comprises a sealed chamber except for the transporting means and the separator further comprises emptying means for emptying the particle receiving means.

In another embodiment, the separator further comprises means for connecting the particle receiving means in flow communication with a conduit for transporting separated particles downstream from the particle receiving means.

In another embodiment, the separator further comprises aerodynamic means associated with the transporting means for directing particles from the cyclonic flow region into the particle receiving means.

In another embodiment, the particle separating means extends under all of the cyclonic flow region to define bottom surface of the cyclonic flow region.

In another embodiment, the transporting means are positioned beneath only one or both of the peripheral and inner portions of the cyclonic flow region.

In another embodiment, the transporting means are distributed regularly around the separating means.

In another embodiment, the fluid contacts only a portion of the separating means and the transporting means are positioned only in said portion.

In another embodiment, the transporting means comprise openings in the separation means.

In accordance with the instant invention, there is also provided a method for separating entrained particles from a fluid flow, the method comprising the steps of introducing a fluid to flow cyclonically in a chamber having a cyclonic flow region, the cyclonic flow region having a radial width, an outer peripheral portion, a medial portion disposed interior of the peripheral portion and an inner portion disposed interior of the medial portion, removing particles from the fluid flow in the cyclone chamber via passages provided beneath one or both of the peripheral and inner portions, and removing the fluid flow from the chamber.

In one embodiment, the method further comprises the steps of storing the particles removed from the fluid flow and inverting the chamber to remove the separated particles.

In another embodiment, the method further comprises the step of transporting separated particles downstream from the chamber.

In another embodiment, the separator comprises the dirt separation mechanism for a vacuum cleaner and the method further comprises passing a cleaning head over a surface to clean the surface.

In another embodiment, the method further comprises directing particles to pass into the passages.

BRIEF DESCRIPTION OF THE DRAWINGS

For a better understanding of the present invention, and to show more clearly how it may be carried into effect, reference will now be made by way of example to the accompanying drawings of a preferred embodiment of the present invention, in which:

FIG. 2 is a cross-sectional view along the line 2—2 in FIG. 1;

FIGS. 3a–3c are cross-sectional views along the line 2—2 in FIG. 1 showing various configurations of the particle separation member of the present invention;

FIGS. 4a and 4b are cross-sectional views along the line 2—2 in FIG. 1 of the cyclonic flow region in alternate embodiments of the device of FIG. 1;

FIGS. 5–7a are top plan views of various alternate configurations of the particle separation member of the present invention;

FIG. 7b is a side sectional view of a cyclone separator incorporating the particle separation member of FIG. 7a;

FIGS. 21a and 21b are top plan views of the chamber emptying means of FIG. 19, shown in the open and closed positions, respectively; and, FIGS. 22a and 22b are top plan views of an alternate embodiment of the components of the chamber emptying means according to the present invention.

DETAILED DESCRIPTION OF THE PREFERRED EMBODIMENT

The improvements in cyclonic separators described herein may be used with or in place of cyclonic separation devices of any sort which are used to separate particulate material from a fluid stream. For example, they may be used with a fluid stream consisting of one or more gasses such as industrial dust collection systems (eg. flue gas scrubbing), they may be used to classify particles according to their size or they may be used with a fluid stream consisting of one or more liquids (eg. a hydrocyclone) or with fluid streams comprising a gas/liquid mixture. It will be appreciated that they these cyclone separators may be used in any manner known in the particle separation art.

Figure 1:
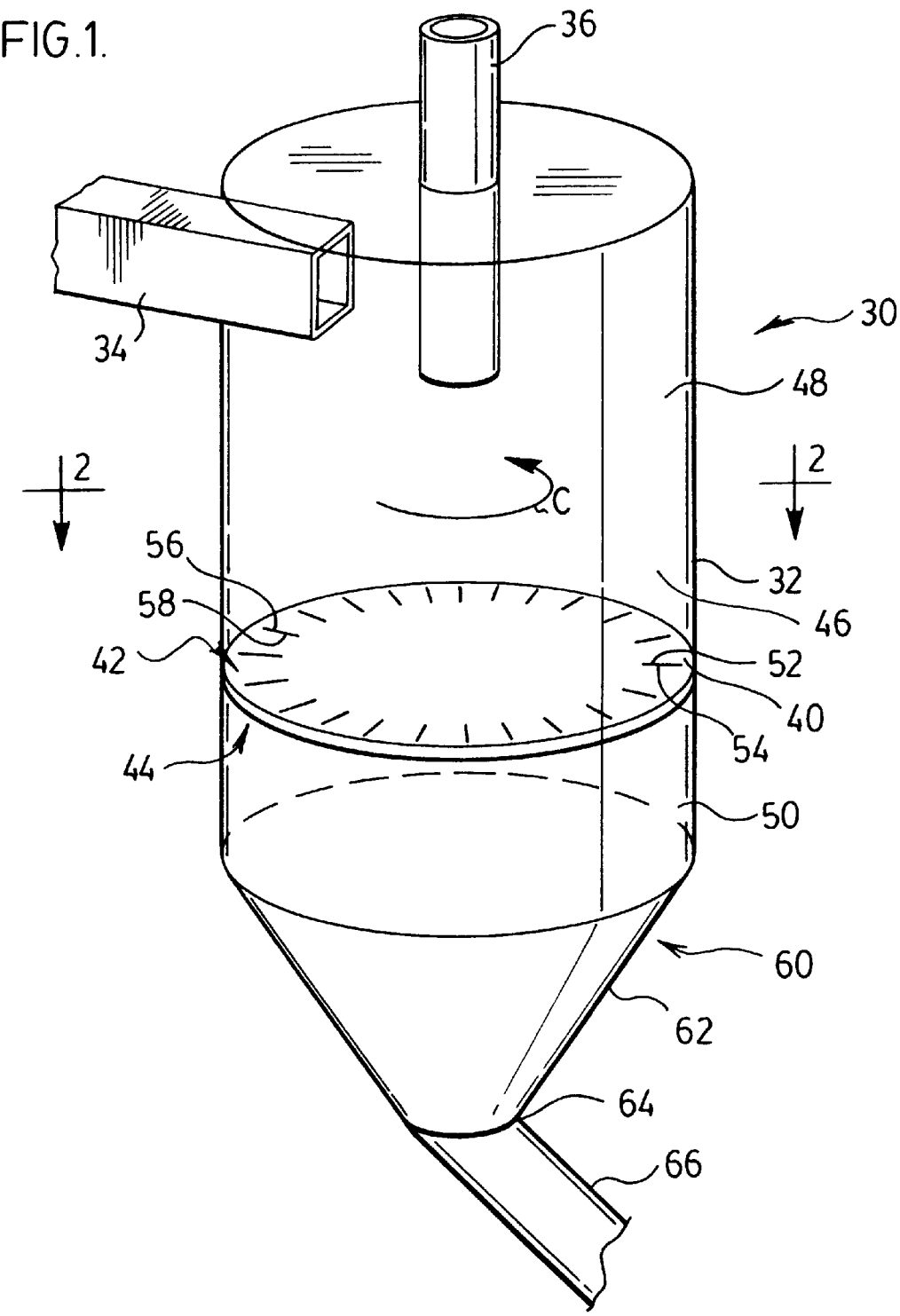
FIG. 1 is an isometric view of a cyclone separator according to the present invention.

A cyclonic separator 30 according to the present invention is shown in FIG. 1. In this embodiment, separator 30 has a bin 32, an inlet 34 for delivering a cyclonic fluid flow to separator 30 and an outlet 36 for removing fluid from the separator. Inlet 34 need not be tangential but may be of any configuration which is capable of providing a cyclonic fluid flow to bin 32, such as an axial or screw cyclone inlet. Disposed in a lower portion of bin 32 is a separation member 40 which comprises a flat, disc-like member, having an upper face 42 and a lower face 44, and which substantially divides bin 32 into a cyclone chamber 46, having a cyclonic flow region 48 defined therein, and a particle receiving chamber 50. Cyclone chamber 46 and particle receiving chamber 50 communicate only via a plurality of apertures 52 in separation member 40. Apertures 52 comprise a plurality of slits 54, each having an upstream edge 56 and a downstream edge 58 relative to the direction of cyclonic fluid flow in cyclone chamber 46 (arrow C), longer than the transverse width and oriented generally radially with respect to bin 32. Particle receiving chamber 50 comprise a hopper 60 having a sloping wall 62 leading to a hopper exit 64. Hopper exit 64 communicates with a particle transport conduit 66 for transporting received particles away from receiving chamber 50.

In use, a particle-laden fluid stream is introduced to cyclone chamber 46 via inlet 34 to flow cyclonically therein. The cyclonic flow proceeds rotationally around and downwardly through bin 32 until it comes into contact with separation member 40. The fluid flow then proceeds cyclonically upwardly through a central portion of cyclonic flow region 48 in cyclone chamber 46 and is ultimately removed from cyclone chamber 46 via outlet 36. As the cyclonic fluid flow moves cyclonically down along the inner wall of cyclone chamber 46, it encounters separation member 40 and travels across separation member 40. The change is speed and direction of the fluid stream as it flows through cyclone chamber 46 causes particles entrained in the fluid stream to become disentrained. These separated particles may fall downwardly due to gravity and/or the may be dragged by the fluid stream to upper surface 42. As the separated particles encounter an aperture 52, they tend to travel through such aperture (depending on particle size) and are transported away from cyclone chamber 46 into particle receiving chamber 50. Some of the fluid will pass through apertures 52 carrying entrained particulate matter through separation member 40 and/or dragging separated particulate matter through separation member 40. Hopper 60 collects these particles for removal by transport conduit 66 (such as due to gravity flow). Larger particles separated from the fluid flow by the cyclonic action and incapable of passing through apertures 52 accumulate on upper surface 42 of separation member 40.

It will thus be appreciated that separation member 40 assist in particle separation in several ways. First, by providing a discontinuous surface, it disrupts the cyclonic flow thus assisting in separating entrained particulate matter from the fluid stream. Secondly, if provides an area (particle receiving chamber 50) which is separate from cyclone chamber 46. If a portion of the fluid stream enters particle receiving chamber 50, the cyclonic flow may be slowed or terminated thus allowing entrained particulate matter to separate out without the potential for reentrainment.

It will be appreciated that cyclone chamber 46 may be of any design known in the art. For example inlet 34 and outlet 36 may be positioned at any location and the walls of chamber 46 may be of any construction known in the art.

Figure 3B:
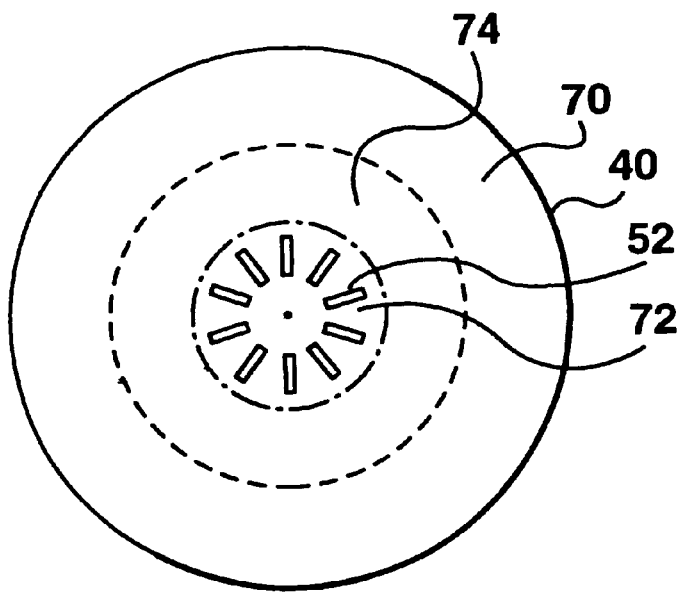
Figure 3C:
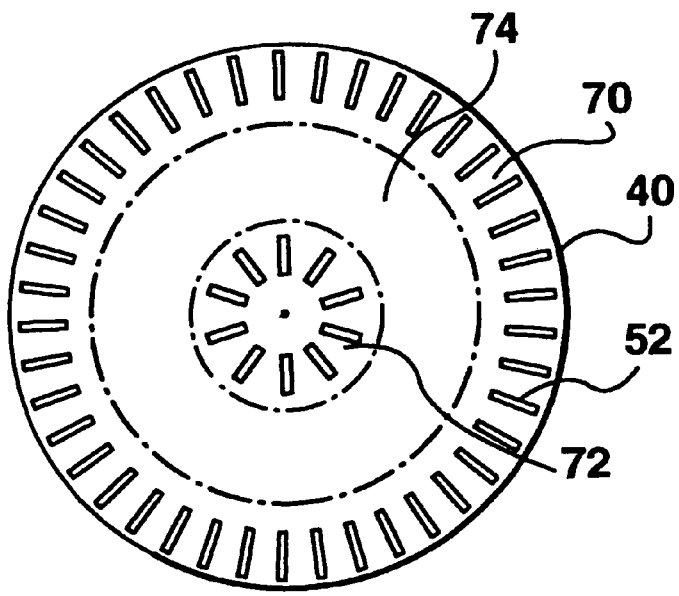

The location of apertures 52 have been found to affect the particle separation characteristics of separation member 40 for a given cyclone configuration and application. Referring to FIG. 2, it has been found that the anti-reentrainment characteristics of separation member 40 are enhanced if apertures 52 are concentrated beneath peripheral portion 70 of cyclonic flow region 48 (see FIG. 3a), inner portion 72 of cyclonic flow region 48 (see FIG. 3b), or both peripheral portion 70 and inner portion 72 (see FIG. 3c) thereby leaving medial portion 74 substantially free from apertures 52. If apertures 52 are provided beneath medial portion 74 without any means provided in particle receiving chamber 50 for preventing any substantial (and preferably all) cyclonic flow in particle separating chamber 50, then some of the particulate material in particle separation chamber 50 will be reentrained into the air flow in cyclone chamber 46. Accordingly, it is preferred that there are no apertures 52 beneath medial portion 74 when there are no means (eg. baffles) to prevent cyclonic flow in particle separation chamber 50. It will be appreciated that a few apertures 52 may be provided in medial portion 74 without creating substantial reentrainment.

Preferably, peripheral portion 70 comprises approximately the outermost one quarter of the radial width 76 of cyclonic flow region 48, and inner portion 72 comprises approximately the innermost one quarter of the radial width 76 of cyclonic flow region 48. Medial portion 74 therefore comprises half of the radial width 76.

If a cyclone separator configuration is varied, the shape and size of cyclonic flow region 48 will vary. For example, referring to FIG. 4a, a cyclone bin 32' having a member 80 centrally position therein results in an annular-shaped cyclonic flow region 48'. Member 80 may be a central air feed conduit, as in the embodiment shown in FIGS. 16 and 17. Regardless of its function, for purposes of the present discussion, member 80 is any feature which occupies a portion of the cyclonic flow region thereby inhibiting cyclonic air flow in that portion of the cyclonic flow region. As a result, cyclonic flow region 48' has a radial width 76' between member 80 and bin 32'. Peripheral and inner portions 70' and 72', respectively, are defined in cyclonic flow region 48' as described above, this time with reference to radial width 76'. Referring to FIG. 4b, bin 32" may have a non-cross sectional cross-section (eg. elliptical). Accordingly, the shape of cyclonic flow region 48", peripheral portion 70" and inner portion 72" are also elliptical. Thus, the peripheral portion 70" and inner portion 72" will have portions having different radial widths. The cyclone may alternately have any non-curvilinear cross-section which permits a substantially cyclonic flow therein. Also, the radial width of cyclone chamber 46 may vary along its longitudinal length, and may be, eg., cylindrical, frustoconical or any other shape having beneficial cyclonic particle separation characteristics.

Figure 6:
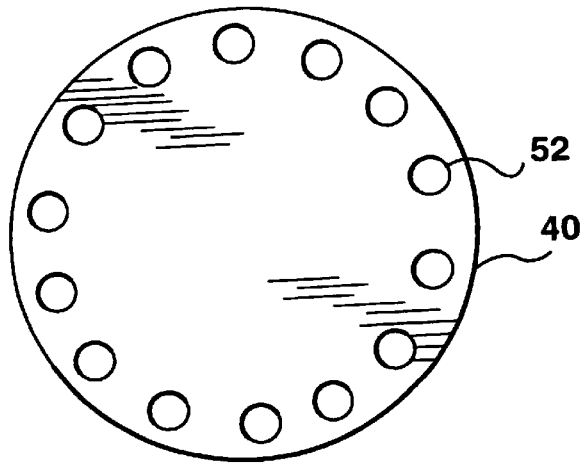
Figure 12:
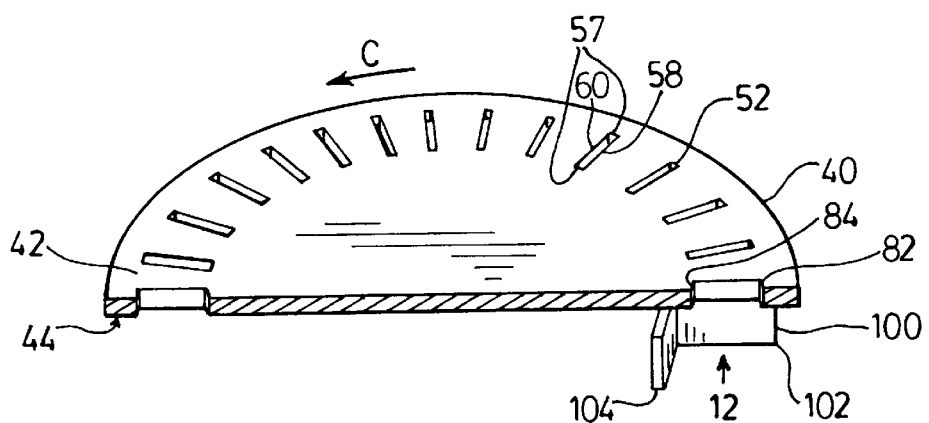
FIG. 12 is a sectional perspective view of the particle separator member having baffle members according to the present invention.

Apertures 52 may be of any particular shape. For example, they may be circular (see FIG. 6), rectangular (see FIG. 12), triangular, or other regular or irregular shape. While apertures 52 may be any shape, in a preferred embodiment, they have a length greater than their width. In particular, as shown in FIG. 12, upstream and downstream edges 58, 60 are preferably longer than the spaced opposed sides 57 extending between edges 58, 60 (eg. edges 58, 60 are preferably at least twice the length of sides 57) so that apertures 52 define slits.

Figure 5:
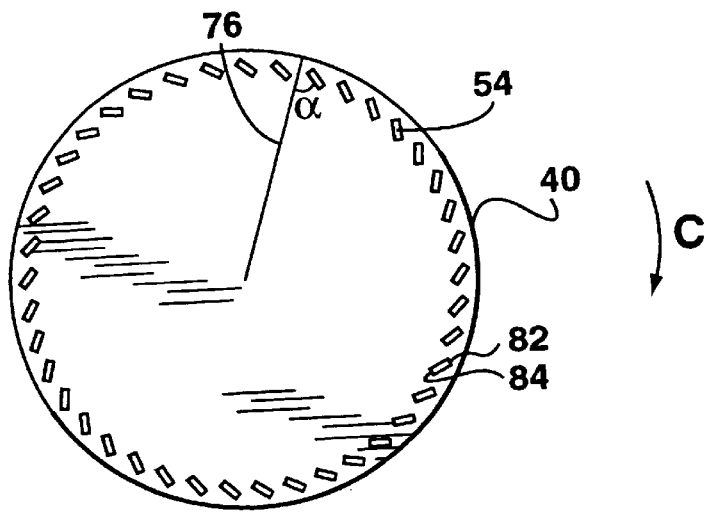

As shown in FIG. 1, slits 54 may extend generally radially (i.e. edges 58, 60 may extend generally radially). However, as shown in FIG. 5, slits 54 are preferably angled slightly, relative to radial width 76, so that the outer edge 82 of an aperture 52 is upstream of the inner edge 84, relative to the cyclonic air flow (indicated by arrow C). The angle α of slits 54 relative to radial width 76 may be up to 45°.

Figure 7A:
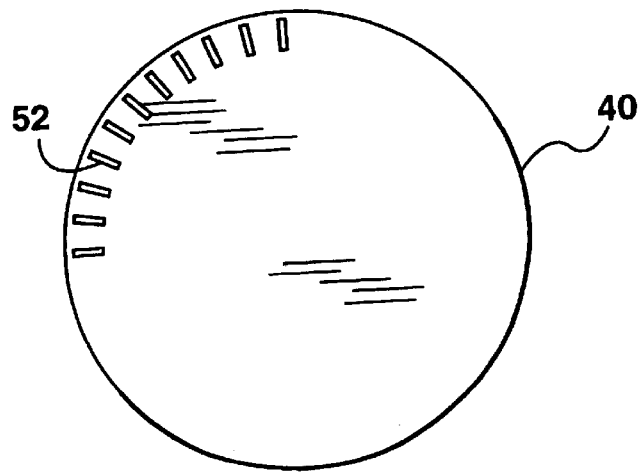

Apertures 52 may be equidistantly spaced apart around separation member 40 (see FIGS. 3a–3c) or they may be positioned with different spacings between adjacent apertures 52. Further, apertures 52 may be continuously positioned around all of separation member 40 (see FIGS. 3a–3c) or apertures 52 may be positioned around only a portion of separation member 40 (see FIG. 7a). Distributing apertures 52 over only a region may be beneficial where only a portion of dirt separation member 40 is contacted by the cyclonic flow in bin 32 (see FIG. 7b). This may be used, for example, if bin 32 has a single inlet 34. In such a case, the sector of separation member 40 which will be contacted by the cyclonic flow may be predetermined and apertures 52 provided only in that sector.

Figure 7B:
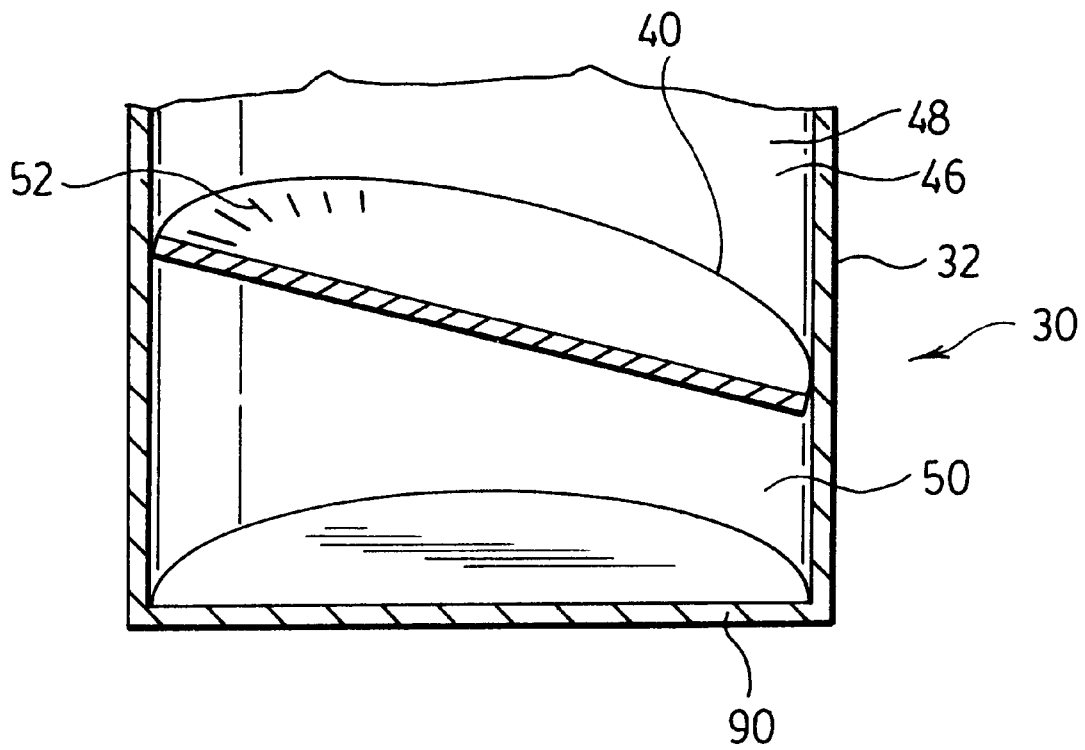

Also, as illustrated in FIG. 7b, it should be noted that dust separation member 40 need not be positioned perpendicular to the cyclonic (ie. longitudinal) axis of cyclonic flow region 48 in cyclone chamber 46. In particular separation member 40 may be at an angle to the axis.

Figure 8:
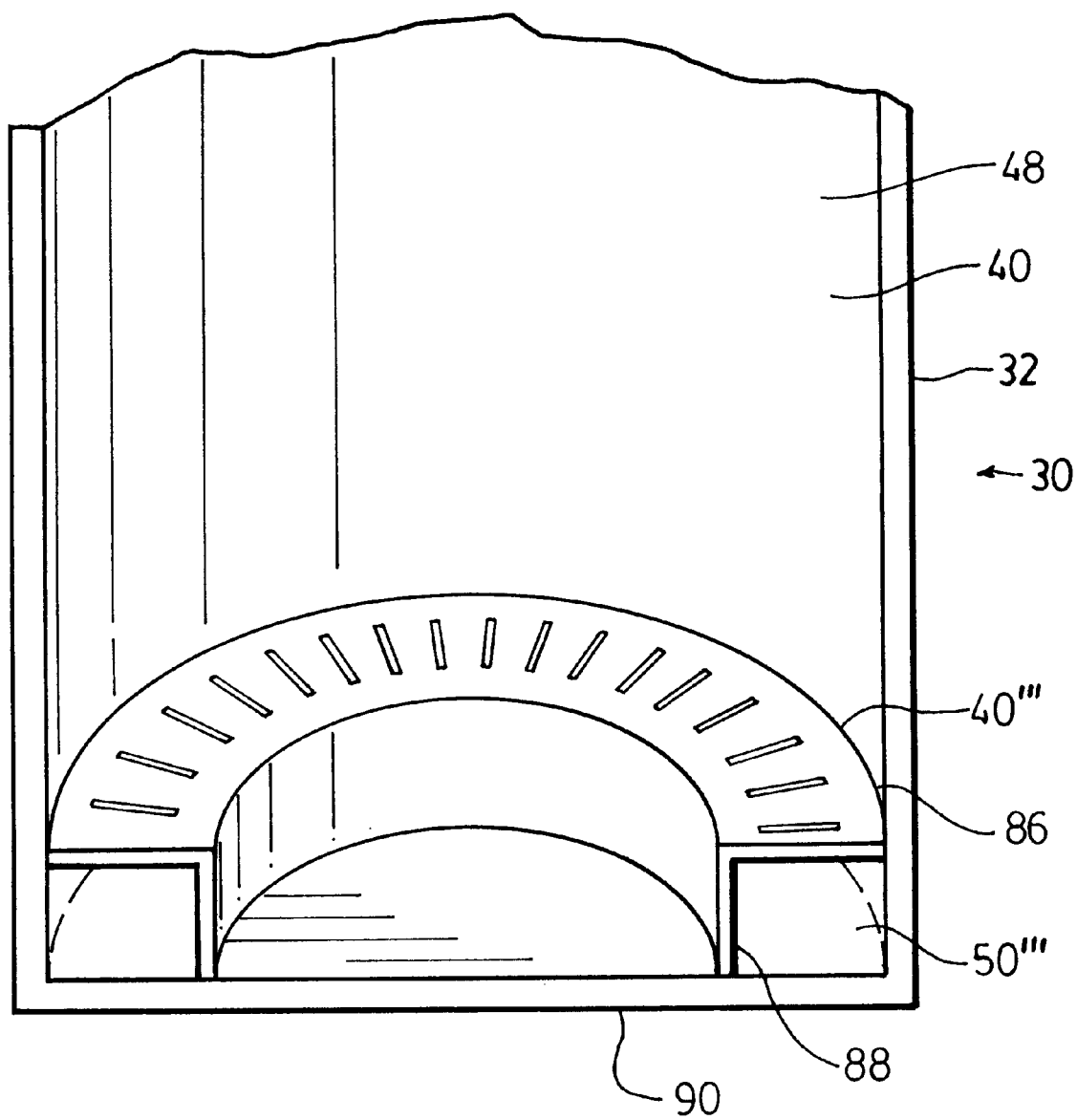
FIG. 8 is a sectional side view of an alternate embodiment of the particle separator member of the present invention.

Referring now to FIG. 8, separation member 40 need not extend across the entirety of cyclonic flow region 48, but rather may be disposed in only the portion of cyclonic flow region 48 beneath which apertures 52 are to be provided. By way of example only, FIG. 8 shows a separation member 40''' which comprises an annular ring 86 disposed beneath peripheral portion 70 of cyclonic flow region 48. Particle receiving chamber 50''' is disposed thereunder, between bin 32 and an inner wall 88. It will be understood by one skilled in the art that separation member 40 may equally have any other configuration suitable for a given separator application without departing from the scope of the present invention. It will be appreciated, for example, that separator 40 may comprise an annular ring positioned beneath inner portion 72 of cyclonic flow region 48.

Figure 9:
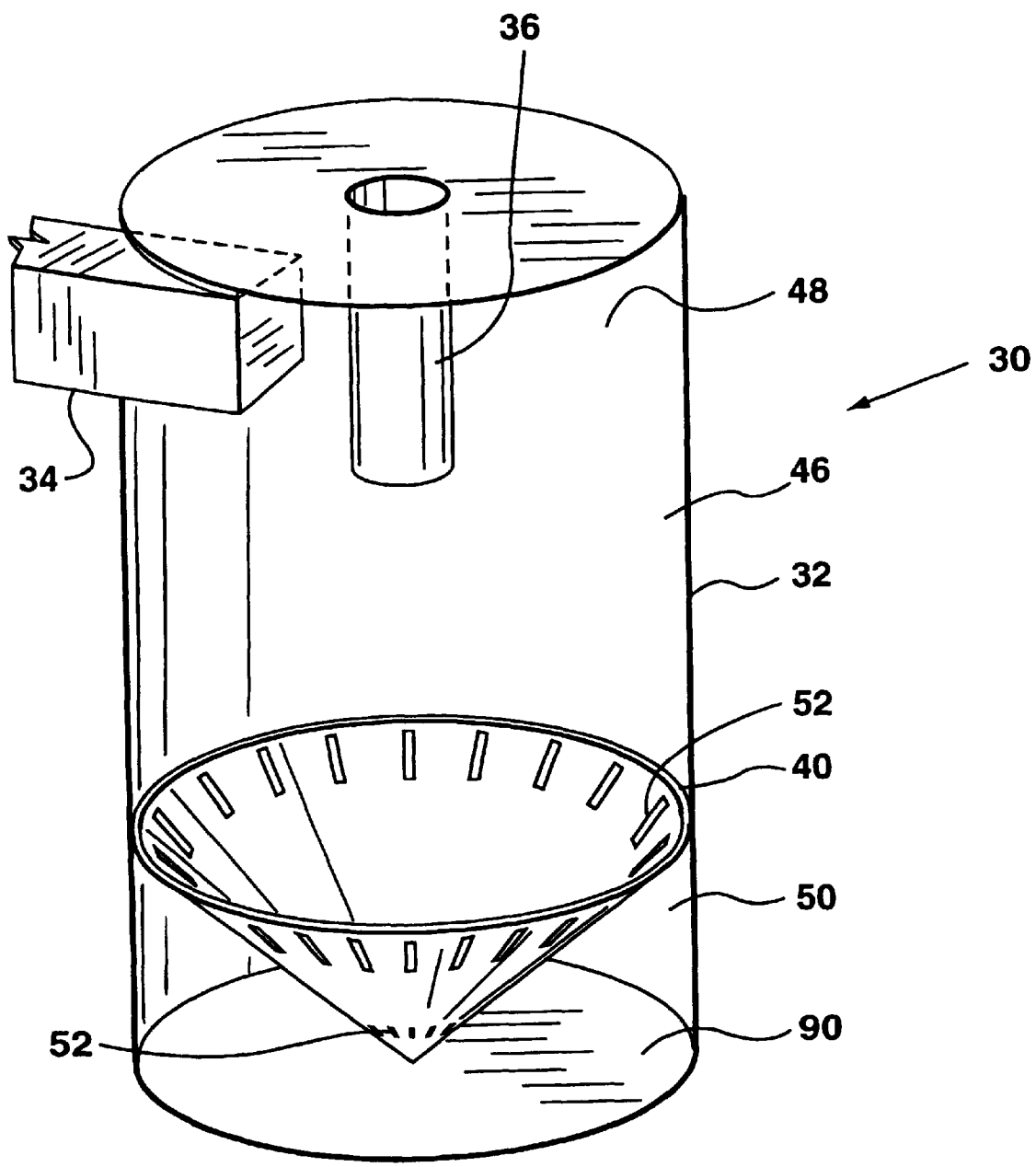
FIG. 9 is an isometric view of a second alternate embodiment of the particle separator member of the present invention.
Figure 10:
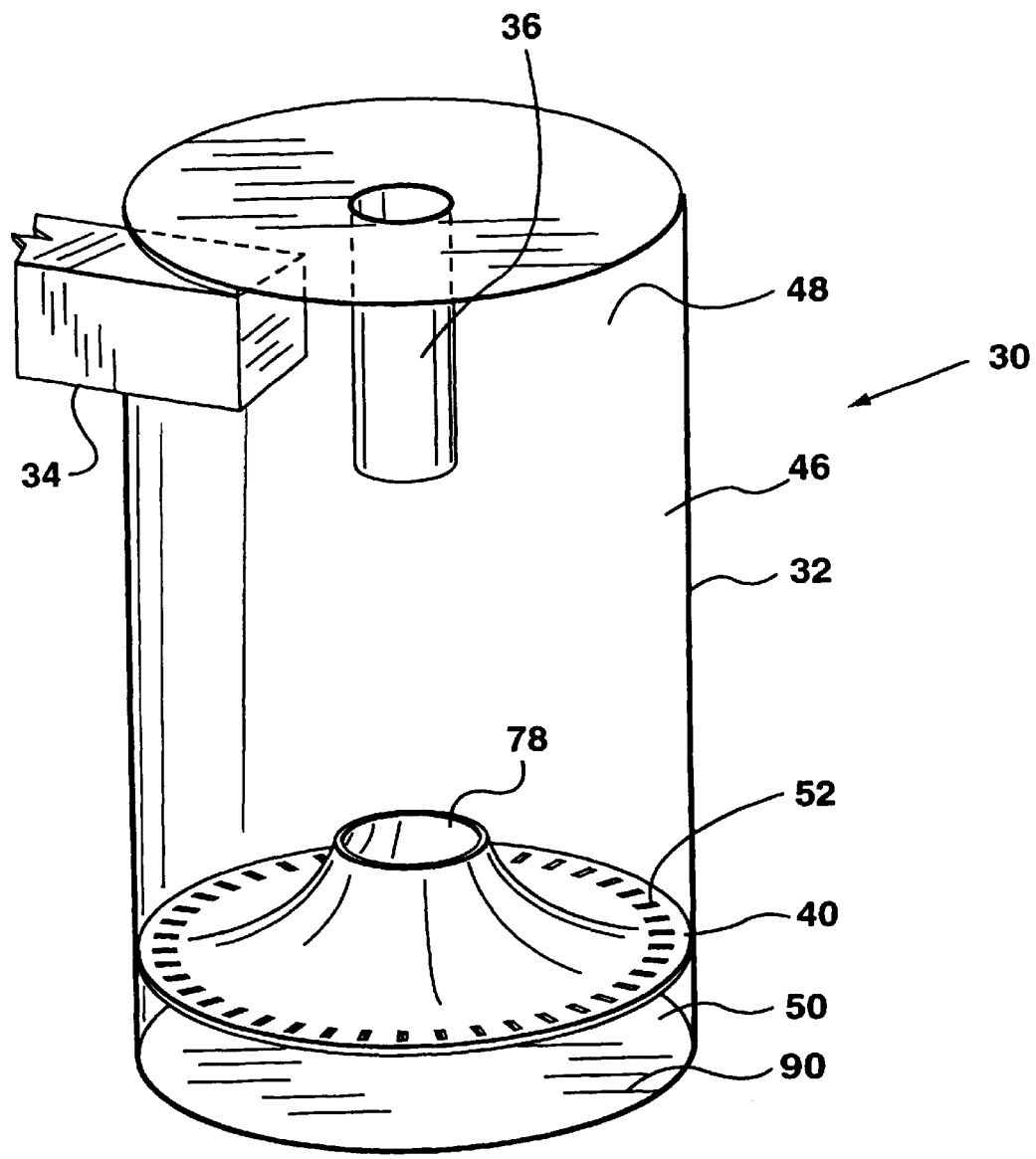
FIG. 10 is an isometric view of a third alternate embodiment of the particle separator member of the present invention.

Referring to FIGS. 9 and 10, respectively, separation member 40 need not be disc-shaped, but may also be conical or trumpet-shaped. It may be convex (i.e. it may project into particle receiving chamber 50 as shown in FIG. 10) or it may be concave (i.e. it may project away from particle receiving chamber 50). It will be appreciated that separation member 40 need not define a continuous surface. For example, as shown in FIG. 10, it may have a curved surface in which apertures 52 are provided and a flat central top portion 78.

Particle receiving chamber 50 need not have hopper 60 thereunder. Instead, it may have a substantially closed bottom 90, as shown in FIGS. 9 and 10. In this configuration, particles received by particle receiving chamber 50 are collected therein for subsequent emptying, as described below. This configuration may be used in a batch process operation.

Figure 11:
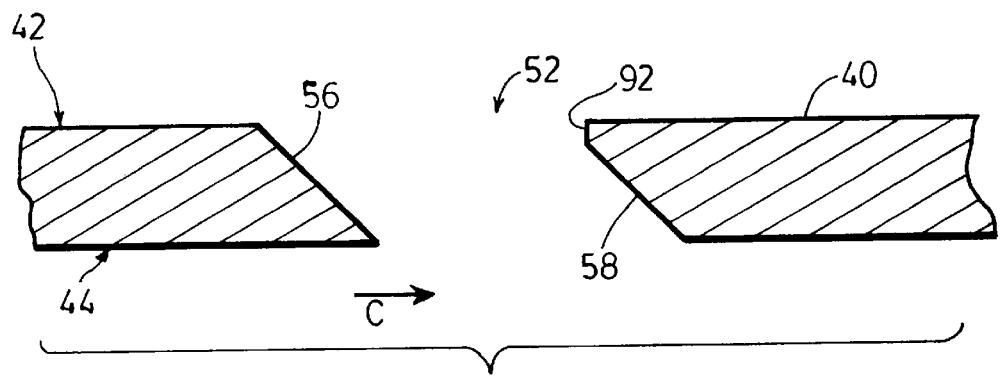
FIG. 11 is an enlarged cross-section view of the particle separator member of the present invention, showing aperture detail.

Referring to FIG. 11, edges 56 and 58 may be aerodynamically shaped to enhance the performance of separation member 40. For example, the thickness of particle separating member 40 is preferably reduced adjacent the upstream edge 56. Referring to FIG. 11, aperture 52 has a sloped upstream edge 56 to assist in directing air and particles from cyclone chamber 46 to particle receiving chamber 50. While either or both of upper surface 42 and lower surface 44 may be sloped with respect to the plane in which particle separation member 40 lies, it is preferred that upper surface 42 is sloped. It has been found that an angle of 45° is preferable. The thickness of downstream edge 58 of particle separating member 40 may be substantially unchanged. Alternately, aperture 52 is preferably shaped to have sloped downstream edge 58 to assist in directing air and particles from cyclone chamber 46 to particle receiving chamber 50. Performance is further enhanced if downstream edge 58 has a blunt surface 92 on an upper portion thereof. Other edge configurations may also be beneficially employed.

The reentrainment of deposited particles into the cyclonic flow is related to the speed and degree of cyclonic flow of fluid passing over deposited particles. Accordingly, any reduction in the cyclonic flow of the fluid within the particle receiving chamber will beneficially enhance the anti-reentrainment properties of the separator. To that end, referring to FIG. 12 particle receiving chamber 50 may be provided with a plurality of baffles 100. The baffles operate to reduce and preferably stop the cyclonic flow of air beneath particle separation member 40.

Preferably, these are provided an lower surface 44 and extend away from particle separation member 40. If separator 30 has a bottom 90, then preferably, baffles 100 extend from lower surface 44 towards bottom 90 but do not touch bottom 90. Baffles 100 preferably extend approximately three-quarters of the distance from lower surface 44 of separation member 40 to the bottom 90 of particle receiving chamber 50, but may be longer or shorter if desired. Preferably baffles 100 are parallel to the longitudinal axis of cyclone bin 32.

A baffle 100 is preferably disposed adjacent each aperture 52 on the downstream side, relative to cyclonic flow in cyclonic chamber 46 (arrow C). For example, a baffle 100 may be offset 15° downstream from its associated aperture 52. It will be appreciated that a baffle 100 need not be associated with each aperture 52. Preferably the baffles are immediately downstream of each aperture 52.

Baffles 100 comprises a wall 102 which may extend radially inwardly or which may be curved. Preferably wall 102 is substantially parallel to aperture 52 along its length. Wall 102 extends at least coterminously with the length of edges 56, 58 apertures 52. Preferably, wall extends at least three times the length of edges 56, 58.

Figure 13:
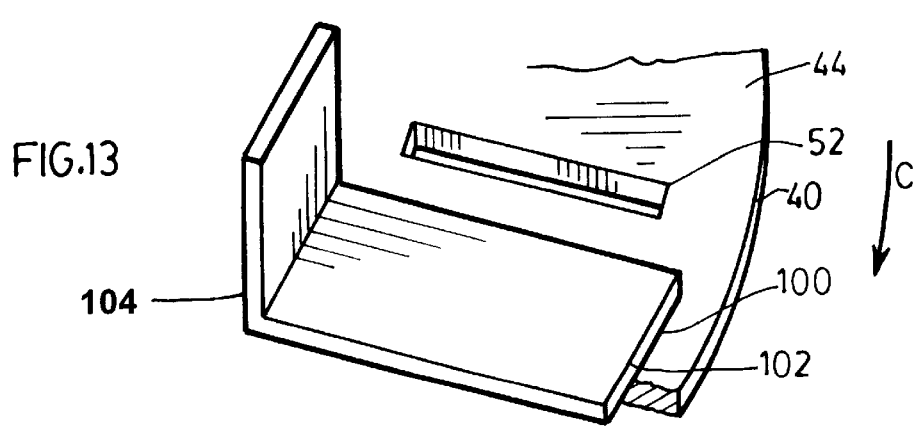
FIG. 13 is an enlarged bottom plan view in the direction of arrow 12 of the baffles of FIG. 12.

As shown in FIGS. 12 and 13, baffle 100 may also have a lateral wall 104 disposed adjacent outer and/or inner edges 82 and 84 of aperture 52. Wall 104 preferably extends from wall 102 in the upstream direction. If an apertures 52 is disposed in peripheral portion 70, baffle 100 preferable has one lateral wall 104 only, disposed adjacent inner edge 84. Wall 102 is positioned inward of edge 84 so as to define a dead air space beneath aperture 52. If an aperture 52 is located in inner portion 72, baffle 100 preferably has a lateral wall 104 disposed adjacent inner edge 84 and outer edge 82 of aperture 52 (not shown). Walls 104 may thus effectively define an open central area in particle receiving chamber 50.

Figure 14:
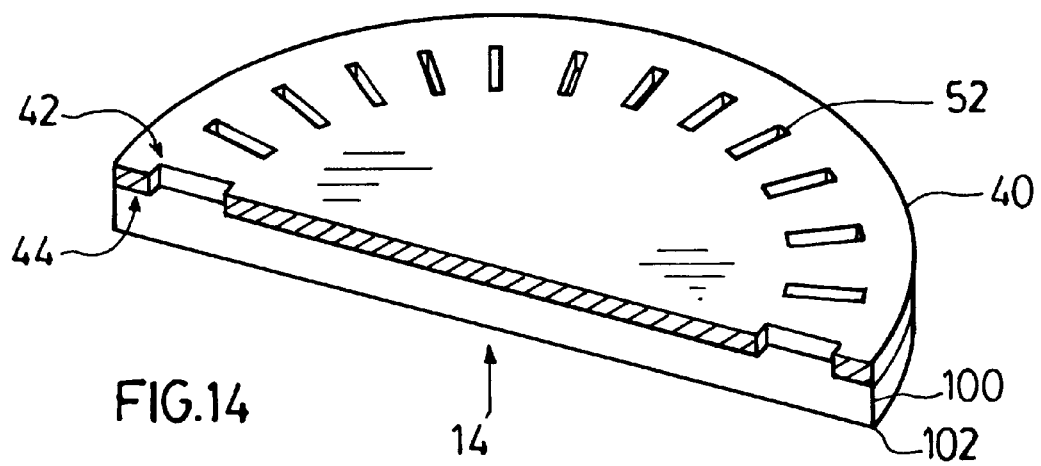
FIG. 14 is a sectional perspective view of and alternate embodiment of the baffle members according to the present invention.
Figure 15:
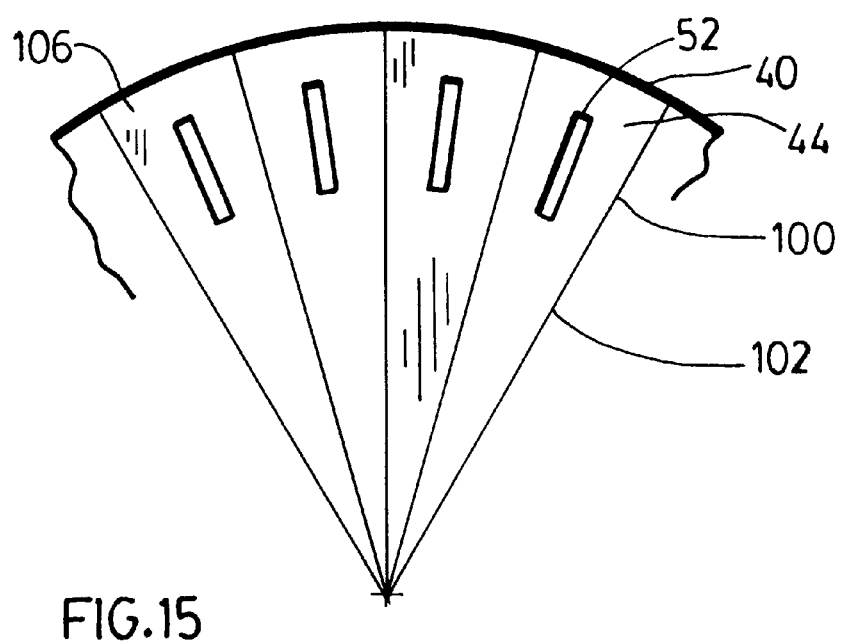
FIG. 15 is a bottom plan view of the baffle members of FIG. 14.

Baffles 100, configured as a wall 102 alone or in conjunction with a lateral wall 104, reduce and preferably stop the cyclonic nature of the fluid flowing beneath separation member 40. Referring to FIGS. 14 and 15, baffles 100 may extend from the wall of bin 32 to its centre to effectively divide particle receiving chamber 50 into a plurality of pie-shaped compartments 106 within particle receiving chamber 50. This configuration substantially inhibits any fluid flow, cyclonic or otherwise, within compartments 106, thereby beneficially enhancing the anti-reentrainment of characteristics of separation member 40.

Although as described above, it is desirable to position apertures 52 in peripheral portion 70 and/or inner portion 72 of cyclonic flow region 48, when baffles 100 are used in conjunction with apertures 52 the positioning of apertures 52 is less critical. In such a case, apertures 52 with baffles 100 may be positioned at any location along the radial width of particle separation member 40 and may be disposed in nay one or more of inner portion 72, medial portion 74 and peripheral portion 70 of cyclonic flow region 48.

Figure 16:
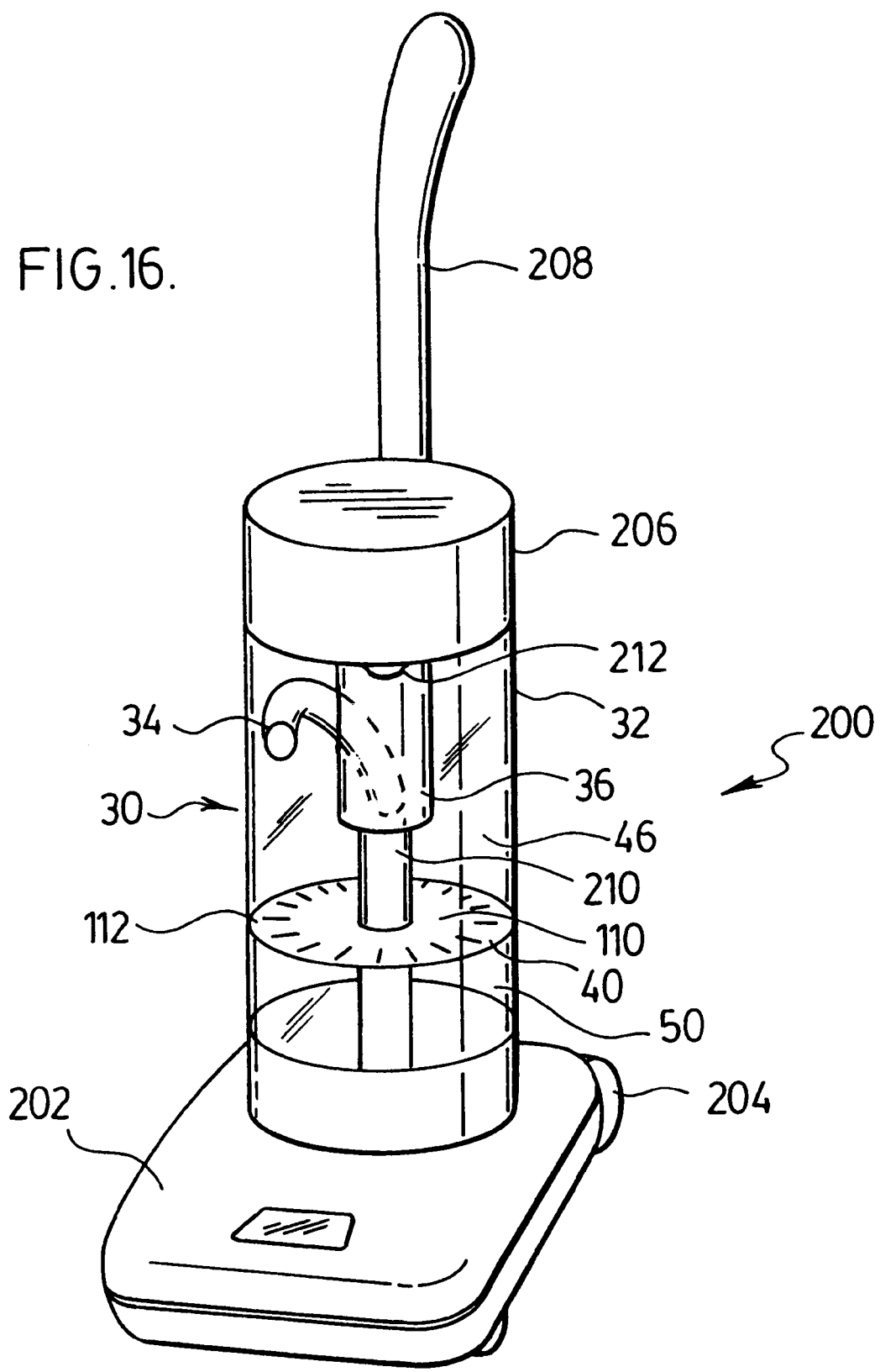
FIG. 16 is an perspective view of a household vacuum cleaner incorporating a cyclone separator according to the present invention.
Figure 17:
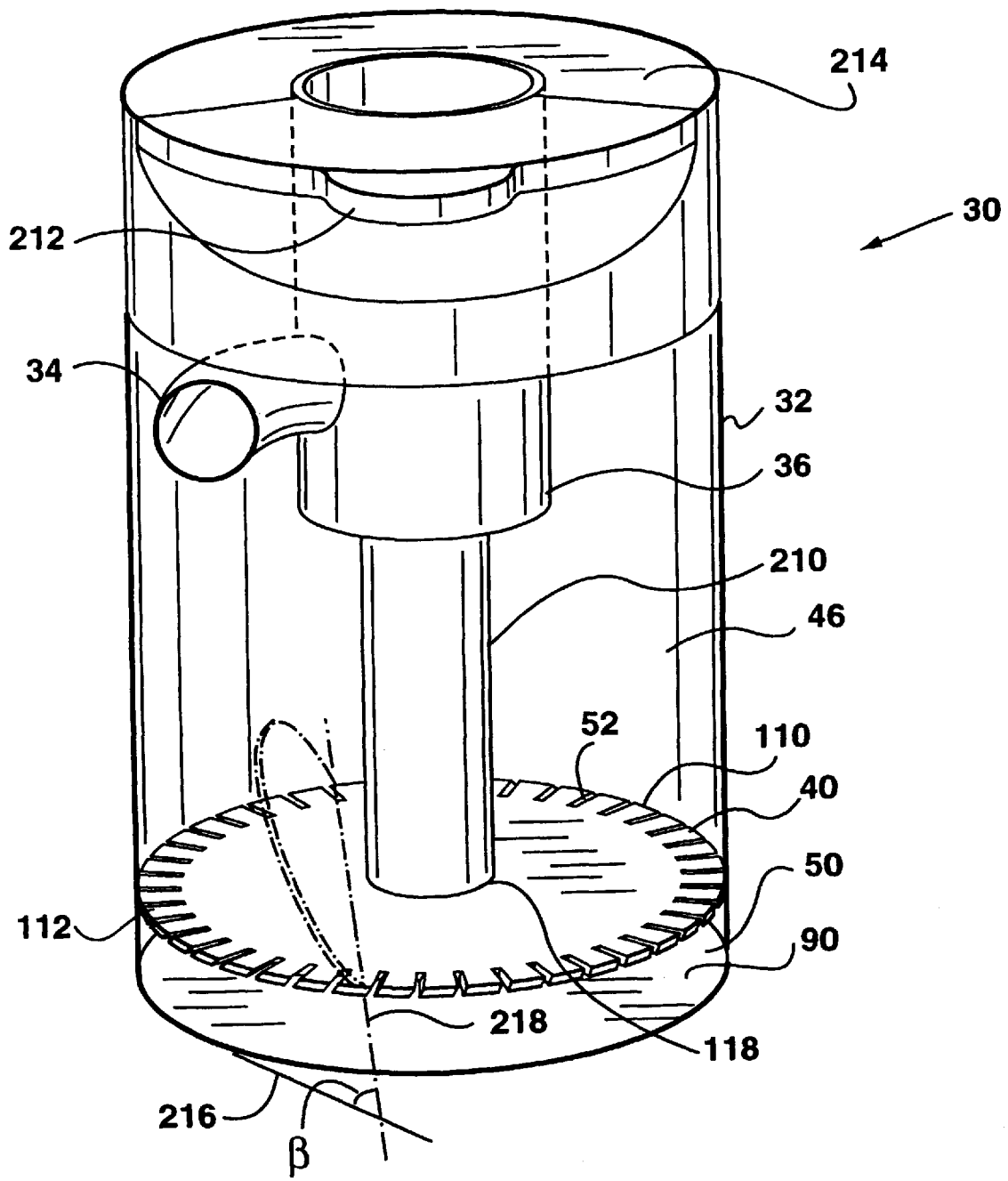
FIG. 17 is an enlarged perspective view of the bin of FIG. 16 when removed from the vacuum cleaner.

The one application as exemplified in FIGS. 16 and 17, the particle separation member may be used with a cyclone separator for a vacuum cleaner. While separator 30 may be used in any vacuum cleaner (eg. upright, canister or a central vacuum cleaning system), it will be described as it may be used in an upright vacuum cleaner.

In this application, vacuum cleaner 200 has a floor cleaning head 202, means for moving cleaning head 202 across a floor (eg. wheels 204), main casing 206 rotatably attached to cleaner head 202, and a handle 208 for moving cleaner 200 across the floor. Main casing 206 houses separator 30. In this embodiment, a single separator 30 comprises a central air feed conduit 210 in communication with a air nozzle (not shown) adjacent the floor in cleaner head 202, and leading to a curved air inlet 34.

Referring to FIG. 17, bin 32 is removable from main casing 206, via the application of pressure by the hand of a user to handle 212. Bin 32 has an open end 214 and defines a cyclone chamber 46 and particle receiving chamber 50 therein. Separation member 40 has a plurality of apertures 52 disposed in peripheral portion 70 thereof. An air outlet is disposed centrally in an upper portion of cyclone chamber 46.

In use, an air flow is created by a motor (not shown) in vacuum cleaner 200 to draw air from, eg., the nozzle of cleaner head 202, through centre air feed conduit 210 and into cyclone chamber 46 via inlet 34. Cyclonic flow is maintained in cyclone chamber 46 thereby causing particles entrained in the cyclonic flow to be deposited, with smaller particles passing through apertures 52 into particle receiving chamber 50, while larger particles (eg. elongate particles such as hair, carpet fibres and the like) are deposited on upper surface 42. Air then exits cyclone chamber via air outlet 36, though the motor and then exits the cleaner. The finer dirt tends to be separated and deposited in particle receiving chamber 50.

Therefore, after operation of vacuum cleaner 200, particles of varying size may have collected in bin 32 both above and below separation member 40. To empty such collected contents, bin 32 is removed from main casing 206, via, eg., handle 212, and inverted (typically over a refuse collector of the like) to cause the collected particles on upper face 42 to fall from bin 32 under the influence of gravity.

If cyclone separator has a closed bottom 90, then a door or the like is preferably provided to assist in emptying chamber 50. The door may be provided on the outer wall of bin 32. Preferably, particle separation member 40 is constructed to assist in emptying the contents of particle receiving chamber 50 when bin 32 is inverted. To this end, particle separation member 40 may be constructed to provide an opening when bin 32 is inverted (see for example FIGS. 17 and 18) or a door may be provided in particle separation member 32 prior to inverting bin 32 (see for example FIGS. 19, 20a, 20b, 21a, 21b, 22a and 22b).

Figure 18:
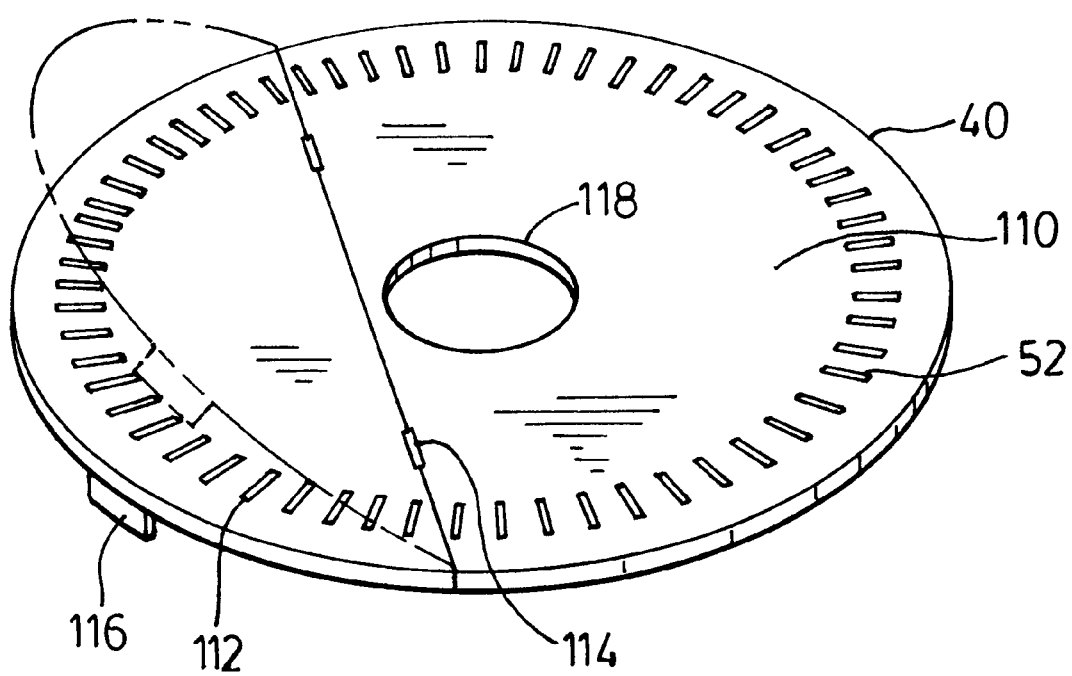
FIG. 18 is an enlarged perspective view of the access member of FIG. 17.

Pursuant to the first alternative, separation member 40 may comprise a main body 110 and an access member 112, as shown in FIG. 18. Access member 112 comprises a chord section of separation member 40 pivotally connected to main body 110 by a hinge member 114 to swing between a closed position, substantially planar with main body 110 (as6 represented by the solid lines in FIGS. 17 and 18) and an open position, wherein access member 112 swings upwardly relative to main body 110 (as represented by the broken lines in FIGS. 17 and 18).

Referring again to FIG. 17, when bin 32 is removed from vacuum cleaner 200 and inverted, access member 112, by virtue of its pivoting connection to main body 110, is permitted to freely swings to its "open" position under the influence of gravity, thereby permitting the contents of particle receiving chamber 50 to fall from particle receiving chamber 50 and out of bin 32. When bin 32 is returned to its upright position, the access member 112 falls to its closed position under the influence of gravity. To bias access member 112 towards its closed positioned when bin 32 is upright, access member 112 may optionally be provided with a weight 116, or a suitable spring means (not shown) or other biasing means known to those skilled in the art. Hole 118 is provided to permit centre air feed conduit 210 to pass therethrough.

The direction of the pivot axis 218 of hinge member 114 is preferably selected to assist access member 112 to remain closed while the vacuum cleaner is in use. If the vacuum cleaner is an upright vacuum cleaner, then particle separation member 40 will be moved from a generally horizontally disposed position when main casing 206 is in the upright storage position to an inclined position when main casing 206 is pivoted to the in use position. Access member 112 has a pivot axis 218 which is preferably not parallel to pivot axis 216 of the upper casing 206 of the vacuum cleaner. In such a case, no weight may be required. Preferably, pivot axis 218 of access member 112 is at an angle β of 10–50°, preferably 20° to 40°, and more preferably about 30° to the pivot axis 216 of upper casing 206 (see FIG. 17).

Access member 112 is preferably provided in the rear portion of the cyclone bin 32 to prevent access member 112 from opening during use. In particular, all or a major portion of access member 122 is preferably positioned rearward of centre air feed 210 (i.e. towards handle 208). In such a case, no weight may be required.

Figure 19:
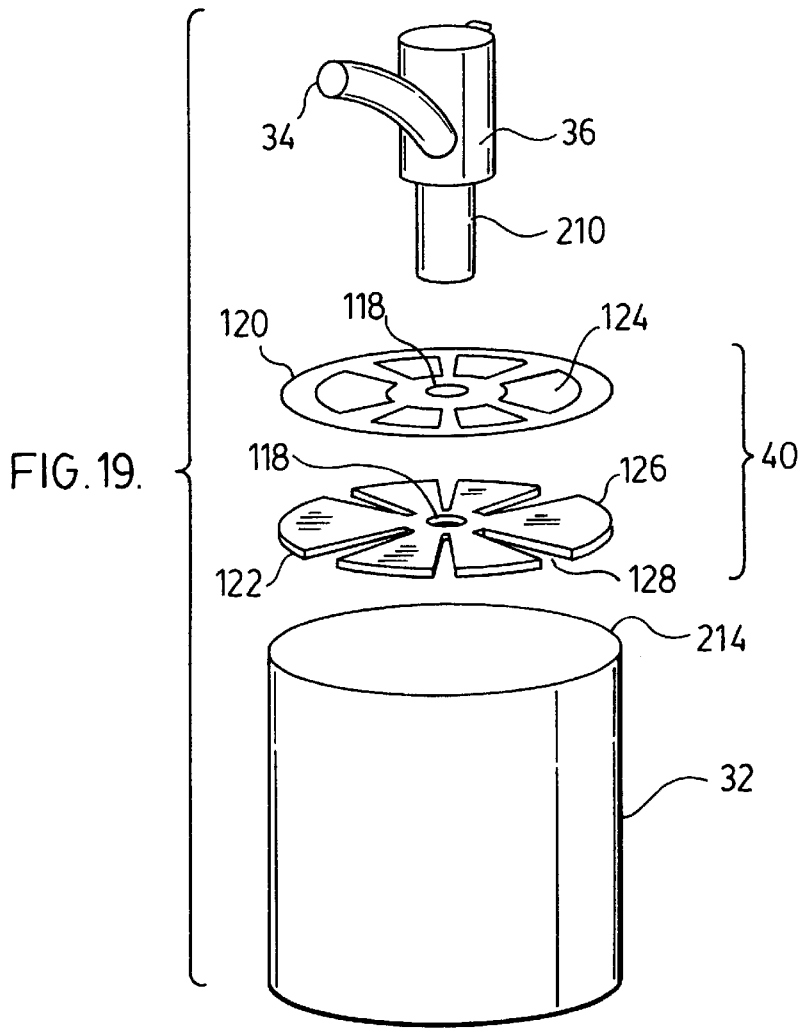
FIG. 19 is an exploded perspective view of a chamber emptying means according to the present invention.
Figure 20A:
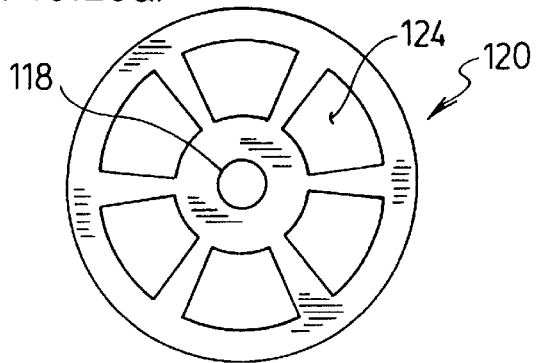
FIGS. 20a and 20b are top plan views of the components of the chamber emptying means of FIG. 19.
Figure 20B:
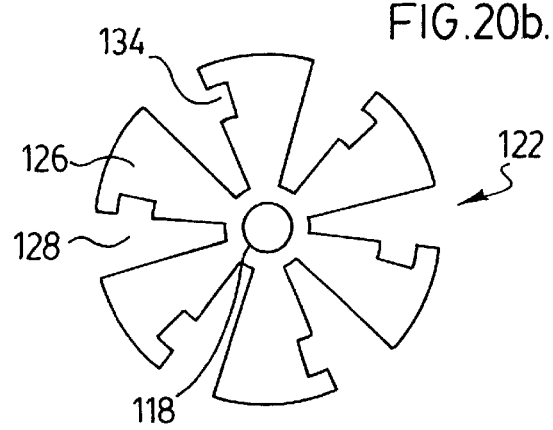

In an alternate configuration, referring to FIG. 19 separation member 40 comprises an first member 120 and a second member 122. First member 120 has a plurality of openings 124. Second member 122 a plurality of solid members 126 spaced apart by open areas 128. First and second members 120 and 122 are configured and sized such that, when first member 120 is positioned immediately above second member 122, first and second members are positionable between a first, "open" position, wherein openings 124 and open areas 128 are substantially aligned (see FIG. 21a), and a second, "closed" position, wherein openings 124 and open areas 128 are offset, such that solid members 126 substantially close openings 124 (see FIG. 21b). When first member 120 and second member 122 are rotated to the "open" position, openings 124 and open areas 128 provide a plurality of access ports 132 from particle receiving chamber 50 to cyclone chamber 46 (see FIG. 21a).

Separation member 40 must be provided with apertures 52. Apertures 52 may be provided as openings in first member 120 such as were discussed with respect to FIG. 1. Alternately, apertures 52 may be created by constructing members 120 and 122 to leave apertures 52 when they are in the closed position. To this end, solid members 126 may be rotatably so as to only substantially underlie and block openings 124 so as to create a plurality of openings which function as apertures 52 in separation member 40. Alternately, solid members 126 may have recessed portions 134 provided therein (see FIG. 20b) so that when solid member 126 fully underlies openings 124, a plurality of holes 130 are created (see FIG. 21b).

In normal operation, first member 120 and second member 122 are in their "closed" position, such that a plurality of apertures 52 are defined in separation member 40. When in this position, apertures 52 perform a function substantially as described above. To empty the collected contents of bin 32, and in particular, the contents of particle receiving chamber 50, bin 32 is removed from main casing 206 of vacuum cleaner 200, as described above, and first and second members 120 and 122 are moved to their "open" position, thereby opening access ports 132. The bin is then inverted to empty the collected contents and access ports 132 permit the separated particles in particle receiving chamber 50 to exit into cyclone chamber 46 and out of bin 32. Thus bin 32 and chamber 50 may be emptied at the same time. First and second members 120 and 122 are then returned to their "closed" position, and the bin returned to main casing 206, to ready vacuum cleaner 200 for further operation.

For convenience, the movement of first and second members 120 and 122 from their "closed" to "open" positions may be automated. This may be achieved by any means known in the art. For example, such movement may be linked to the removal of bin 32 from main casing 206, such that removal of the bin causes first and second members 120 and 122 to move from their "closed" to "open" positions without further action by the user. In one embodiment, bin 32 is bayonet-mounted (not shown) in main casing 206 such bin 32 must be rotated about its longitudinal axis before bin 32 may be removed from main casing 206. In response to such rotation, a bayonet-type mechanism (not shown), as is known in the art, triggers a movement of first and second members 120 and 122 from the "closed" to "open" positions, thereby automatically opening separation member 40 in preparation for emptying. For example, member 120 may be affixed to the inner wall of bin 32 and centre air feed 210 may freely rotate within hole 118. Centre air feed 210 may be rotatably mounted in bin 32 so as not to rotate as bin 32 is rotated for removal and member 122 may be affixed to centre air feed 210. Thus, as bin 32 is rotated for removal, member 120 rotates with bin 32 relative to member 122 to move separation member 40 to the "open" position. Alternately, a trip-lever mechanism (not shown) may be used such that a horizontal translational movement of bin 32 out of main casing 206 trips a lever which causes first and second members 120 and 122 to move from the "closed" to "open" positions, thereby automatically opening separation member 40 in preparation for emptying. Yet other methods of automatically moving second member 122 upon removal of bin 32 may be devised.

It will be understood that first and second members 120 and 122 may be of any configuration which provides "closed" and "open" positions, as described above. For example, first and second members 120 and 122 may be substantially identically shaped (see FIGS. 22a–b). It will be understood by one skilled in the art that first member 120 and second member 122 need not move rotationally with respect to one another, but may also move radially or translationally.

Although the above description has described the incorporation of the present invention into a household upright vacuum cleaner, it is understood that the present invention can equally be incorporated into a household canister vacuum cleaner, central vacuum system, backpack cleaner, as well as any industrial cyclonic separators.

Equally, it will be apparent to one skilled in the art that the separation member according to the present invention may also be employed in the classification and/or sorting of particles by size. Particles to be sorted are entrained in a fluid flow and introduced to a cyclonic separator having a separation member according to the present invention, the separation member having a first aperture size. Particles smaller than the first aperture size are permitted to pass through the separation member and into a hopper for transfer to a subsequent cyclonic separator while larger particles are collected on top of the particle separator. The particle passing through the separation member are introduced cyclonically to a second cyclone having a separation member with apertures of a second, smaller size, relative to the first cyclone. As in the first cyclone, particles smaller than the second aperture size are permitted to pass through the separation member and into a hopper for transfer to a third cyclonic separator, while larger particle remain on the separation member in the second cyclone chamber. This process is repeated, as required, until the particles are classified as needed.

The introduction of the separation member according to the present invention to a cyclonic separator dramatically increases the overall efficiency of the separator. The prior art teaches the need for a plurality of cyclones in order achieve ultra-high particle separation efficiencies. However, it has been found that ultra-high efficiencies can be obtained in a single stage cyclone incorporating the particle separation member of the present invention. Cleaning efficiencies in excess of 95% may be obtained with a single stage separator utilizing the separation member according to the present invention, thereby negating the need for second stage cyclonic separation altogether. Cleaning efficiencies of over 99% have also been achieved for particle laden air streams.

Therefore, the present invention permits ultra-high efficiencies to be attained with relatively simple separator configurations compared to the prior art. The reduction of separator structure, in turn, beneficially reduces the fluid pressure losses across the separator, thereby permits a deeper vacuum (increased fluid flow rate) to be drawn for a given motor size. For household vacuum cleaner applications, the motor size may be reduced without sacrificing the vacuum strength of the device. The reduced structure and motor size also beneficially result in a cost and size savings to the overall separator unit.

The baffle members according to the present invention greatly enhance the performance of the separation member and greatly assist in obtaining ultra-high efficiencies. The projection of baffle members into the particle receiving chamber beneficially disrupts and, depending on the baffle configuration, substantially inhibits cyclonic flow in the particle receiving chamber, thereby reducing the reentrainment of deposited particles.

The separation member access means according to the present invention provides a simple and convenient method of emptying collected particles from two chambers simultaneously, namely larger particles deposited in the cyclone chamber (i.e. on top of the particle separation member) and finer particles deposited in the particle receiving chamber. This provides a simple and convenient automatic method of emptying dual chambers.

The superimposed particle separation member according to the present invention also provides a convenient method for emptying collected particles from two chambers simultaneously. To enhance the convenience, the movement of the superimposed members may be linked to open when the bin is removed from the main casing.

While the above description constitutes the preferred embodiments, it will be appreciated that the present invention is susceptible to modification and change without departing from the fair meaning of the proper scope of the accompanying claims.

We claim:

1. A separator for separating entrained particles from a fluid flow, the separator comprising:
   a) a cyclone chamber having an outer wall and a cyclonic flow region, the cyclonic flow region having a radial width, an outer peripheral portion, a medial portion disposed interior of the peripheral portion and an inner portion disposed interior of the medial portion, the inner portion having a radial inner extent and the outer portion having a radial outer extent;
   b) a fluid inlet for introducing a cyclonic fluid flow to the cyclonic flow region;
   c) a fluid outlet for removing the fluid flow from the cyclonic chamber; a particle separating member positioned in the cyclone chamber beneath at least a portion of the cyclonic flow region, the particle separating member having a continuous surface from the radial inner extent of the inner portion to the radial outer extent of the outer portion except for a plurality of apertures; and,
   d) a particle receiving chamber disposed beneath the particle separating member for receiving particles passing into the particle receiving chamber through the apertures, the particle receiving chamber having an essentially sealed bottom wherein the apertures are disposed on the particle separating member such that the medial portion of the cyclonic flow region is substantially free from said apertures and the particle separating member is configured to inhibit re-entrainment of particles from the particle receiving chamber to the cyclonic flow region.

2. The separator of claim 1 wherein the peripheral portion of the cyclonic flow region comprises one quarter of the radial width of the cyclonic flow region.

3. The separator of claim 2 wherein the medial portion of the cyclonic flow region comprises one half of the radial width of the cyclonic flow portion.

4. The separator of claim 1 wherein the particle receiving chamber comprises a sealed chamber except for the apertures.

5. The separator of claim 1 wherein the particle receiving chamber is in communication with a conduit for transporting separated particles downstream from the particle receiving chamber.

6. The separator of claim 1 further comprising:
   (a) a cleaner head adapted for movement over a floor and having a fluid nozzle positionable adjacent the floor, the nozzle in fluid flow communication via a passageway with the separator fluid inlet;
   (b) a handle for moving the cleaner head over the floor; and,
   (c) a casing for housing the cyclone chamber.

7. The separator of claim 6 wherein the casing is pivotally mounted to the cleaner head.

8. The separator of claim 6 wherein the passageway comprises a flexible portion that is positioned external of the cleaner head and the casing and the handle is affixed to the cleaner head.

9. The separator of claim 1 wherein the apertures are sized to inhibit elongate particles from passing therethrough, whereby elongate particles collect on top of the particle separating member.

10. The separator of claim 1 wherein the apertures are shaped to aerodynamically direct particles from the cyclonic flow region into the particle receiving chamber.

11. The separator of claim 1 wherein the apertures comprise slits having longitudinally extending upstream and downstream edges relative to the fluid flow and transversely extending sides and the edges are longer than the sides.

12. The separator of claim 11 wherein the length of the edges are substantially aligned with the radial width of the cyclone chamber.

13. The separator of claim 11 wherein the length of the edges define a longitudinally extending axis which are at an angle of up to 45° to the radius of the cyclonic flow region.

14. The separator of claim 1 wherein the apertures have an radial outer end and a radial inner end and the radial outer end is positioned adjacent the outer wall of the cyclone chamber.

15. The separator of claim 1 wherein the apertures have an upstream edge and downstream edge, relative to the fluid flow and the thickness of the particle separating member is reduced adjacent the upstream edge of the apertures.

16. The separator of claim 15 wherein the particle separating member has an upper surface and a lower surface and the upper surface is angled towards the particle receiving chamber adjacent the upstream edge and the lower surface is angled away from the aperture adjacent the downstream edge.

17. The separator of claim 1 wherein the particle separating member is disposed substantially perpendicularly to a longitudinal axis of the cyclonic flow region.

18. The separator of claim 1 wherein the particle separating member is disposed at an angle to a longitudinal axis of the cyclonic flow region.

19. The separator of claim 1 wherein the particle separating member is convex or concave.

20. The separator of claim 1 wherein the particle separating member extends under all of the cyclonic flow region to define a bottom surface of the cyclonic flow region.

21. The separator of claim 1 wherein the particle separating member extends essentially under only the outer peripheral portion.

22. The separator of claim 1 wherein the apertures are positioned essentially only beneath the peripheral portion of the cyclonic flow region.

23. The separator of claim 1 wherein the apertures are positioned essentially only beneath the inner portion of the cyclonic flow region.

24. The separator of claim 1 wherein the apertures are positioned beneath only the peripheral and inner portions of the cyclonic flow region.

25. The separator of claim 1 wherein the apertures are distributed regularly around the particle separating member.

26. The separator of claim 1 wherein the fluid contacts only a portion of the particle separating member and the apertures are positioned only in said portion.

27. A separator for separating entrained particles from a fluid flow, the separator comprising:
   a) a cyclone chamber for containing a cyclonic flow in a cyclonic flow region, the cyclonic flow region having a radial width, an outer peripheral portion, a medial portion disposed interior of the peripheral portion and an inner portion disposed interior of the medial portion;
   b) means for introducing a fluid flow to the cyclone flow region for cyclonic rotation therein;

c) means for removing the fluid flow from the cyclone chamber;

d) particle receiving means disposed beneath the cyclone flow region for receiving particles separated from the fluid flow;

e) separation means for essentially isolating the particle receiving means from the cyclone chamber except for transporting means associated with the separation means for connecting the particle receiving means in flow communication with the cyclonic flow region such that, in operation, particles pass through the transporting means to the particle receiving means.

28. The separator of claim 27 wherein the particle receiving means comprises a sealed chamber except for the transporting means and the separator further comprises emptying means for emptying the particle receiving means, wherein said transporting means are positioned outside the medial portion of the cyclonic flow region.

29. The separator of claim 27 further comprising means for connecting the particle receiving means in flow communication with a conduit for transporting separated particles downstream from the particle receiving means.

30. The separator of claim 27 further comprising aerodynamic means associated with the transporting means for directing particles from the cyclonic flow region into the particle receiving means.

31. The separator of claim 27 wherein the particle separating means extends under all of the cyclonic flow region to define a bottom surface of the cyclonic flow region.

32. The separator of claim 27 wherein the transporting means are positioned beneath only one or both of the peripheral and inner portions of the cyclonic flow region.

33. The separator of claim 27 wherein the transporting means are distributed regularly around the separating means.

34. The separator of claim 27 wherein the fluid contacts only a portion of the separating means and the transporting means are positioned only in said portion.

35. The separator of claim 27 wherein the transporting means comprise openings in the separation means.

36. A method of separating entrained particles from a fluid flow, the method comprising the steps of:

a) introducing a fluid to flow cyclonically in a chamber having a cyclonic flow region, the cyclonic flow region having a radial width, an outer peripheral portion, a medial portion disposed interior of the peripheral portion and an inner portion disposed interior of the medial portion;

b) removing particles from the fluid flow in the cyclone chamber via passages provided beneath one or both of the peripheral and inner portions into an area beneath the passages without any substantial re-entrainment of separated material from the area to the cyclonic flow region and essentially terminating cyclonic flow in the area beneath the passages; and, c) removing the fluid flow from the chamber.

37. The method of claim 36 further comprising the steps of storing the particles removed from the fluid flow and inverting the chamber to remove the separated particles.

38. The method of claim 36 further comprising the step of transporting separated particles downstream from the chamber.

39. The method of claim 36 wherein the separator comprises a dirt separation mechanism for a vacuum cleaner and the method further comprises passing a cleaning head over a surface to clean the surface.

40. The method of claim 36 further comprising directing particles to pass into the passages.

* * * * *